United States Patent [19]

Stahl et al.

[11] Patent Number: 4,805,162

[45] Date of Patent: Feb. 14, 1989

[54] FINE AND COARSE SERVO SYSTEM FOR ACCESS AND TRACKING ON AN OPTICAL DISK

[75] Inventors: Karl J. Stahl; Albin K. Johnson, both of Boulder; Brad R. Reddersen, Broomfield; Alexander M. Muckle, Boulder, all of Colo.

[73] Assignee: Storage Technology Partners II, Louisville, Colo.

[21] Appl. No.: 917,259

[22] Filed: Oct. 8, 1986

Related U.S. Application Data

[63] Continuation of Ser. No. 755,953, Jul. 16, 1985, abandoned, which is a continuation of Ser. No. 438,133, Nov. 1, 1982, abandoned.

[51] Int. Cl.$^4$ .................. G11B 21/10; G11B 17/22
[52] U.S. Cl. .................................. 369/44; 369/32; 369/111
[58] Field of Search ............... 369/30, 32, 44, 46, 369/111, 121, 122, 277, 278, 279; 360/75, 77; 346/76 L; 250/204 DF

[56] References Cited

U.S. PATENT DOCUMENTS

| | | | |
|---|---|---|---|
| 3,657,707 | 4/1972 | McFarland | 365/127 |
| 4,085,423 | 4/1978 | Tsunoda et al. | 369/122 |
| 4,094,010 | 6/1978 | Pepperl et al. | 369/44 |
| 4,094,013 | 6/1978 | Hill et al. | 369/44 |
| 4,106,058 | 8/1978 | Romeas et al. | 369/32 |
| 4,123,147 | 10/1978 | Hill et al. | 369/46 X |
| 4,149,198 | 4/1979 | Behr et al. | 360/77 |
| 4,193,090 | 3/1980 | Korpel | 369/109 |
| 4,236,232 | 11/1980 | Jansen et al. | 369/44 |
| 4,290,122 | 9/1981 | Bates et al. | 369/46 |
| 4,321,622 | 3/1982 | Jerome et al. | 369/46 |
| 4,334,299 | 6/1982 | Komurasaki et al. | 369/44 |
| 4,426,694 | 1/1984 | Kimura | 369/46 |
| 4,446,545 | 5/1984 | Van Dijk | 369/44 |
| 4,459,696 | 7/1984 | Corsover et al. | 369/44 X |

FOREIGN PATENT DOCUMENTS

1516285 7/1978 United Kingdom ............... 369/32

OTHER PUBLICATIONS

"Optical Servo Information on Magnetic Recording Disks", Schneider IBM Tech. Disclosure Bulletin, vol. 16, No. 4, Sep. 73.

Primary Examiner—Aristotelis M. Psitos
Attorney, Agent, or Firm—Woodcock Washburn Kurtz Mackiewicz & Norris

[57] ABSTRACT

An optical disk servo system includes a coarse access and tracking system for optical head control and a fine access and tracking system for read/write beam control. Enlarged servo tracks are pre-recorded on the optical disk between bands of data track locations. The coarse system illuminates a relatively large area of the disk surface encompassing at least one of the servo tracks and detects light from the enlarged illuminated area. Suitable means including a photo-detector array identifies and controls the optical head position by means of the light returned from the illuminated servo track. Such photo-detection means are insensitive to light reflected from the data tracks. The fine access and tracking system uses a conventional, three spot tracking and read system, two spots for data track following and one spot for data track reading. The fine access and tracking system controls a galvanometer mirror or other suitable means steering the read spot beams. Data writing is accomplished by fine tracking a previously recorded data track and maintaining the write beam a constant distance therefrom.

9 Claims, 5 Drawing Sheets

_Fig. 7_

_Fig. 8_

FINE AND COARSE SERVO SYSTEM FOR ACCESS AND TRACKING ON AN OPTICAL DISK

This is a continuation of application Ser. No. 755,953, filed July 16, 1985, now abandoned, which is a continuation of Ser. No. 438,133, filed Nov. 1, 1982, now abandoned.

BACKGROUND OF THE INVENTION

This invention relates to optical disk data storage systems and more particularly to a servo system which includes both fine and coarse access and tracking systems.

Optical data storage systems which utilize a disk to optically store information have been the object of extensive research. Like magnetic disk units, these optical disk storage units must have a servo system which controls the positioning of the read/write head to provide direct access to a given track of data recorded thereon, and to accurately follow this track while it is being read or when it is initially written onto the storage medium. To date, most of the prior art optical storage systems have had one of three types of servo systems: physical groove, external encoder or optical feedback.

The simpliest of the systems is the physical groove as is shown, for example, in U.S. Pat. Ns. 4,260,858 and 3,654,401. In such systems, the optical disks are provided with physical grooves, either in a spiral or circular pattern, and an optical read/write head is provided with a stylus or other physical means of engaging the groove. There are several drawbacks associated with this type of system. First, wear is a significant factor. Typically, the disks are formed using dies or molds, which dies or molds are subject to wear during the manufacturing process, hence necessitating their replacement and creating tolerance problems in the formed disks. Physical contact with the head guide stylus during use also causes disk wear, introducing noise. Further, rapid access involving radial movement of the head is difficult to accomplish.

One known approach to overcome the problems associated with the physical groove systems is to dedicate an entire data disk surface to servo tracks. This approach has worked well in magnetic disk systems, where a plurality of magnetic disks are usually provided in a stacked disk pack with a common spindle. The use of one disk surface for servo tracks does not seriously detract from the data storage capacity of such a system. Optical disk systems, on the other hand, in order to be suitable for use in a commercial environment, desirably have only one disk on a spindle with at most two surfaces available for recording both the data and servo information. It is not feasible, therefore, to dedicate an entire optical disk surface to servo tracks without severely sacrificing data storage capacity.

While magnetic disk servo systems can be adapted for use with optical disks, this approach is also very inefficient. Data track density can be made much higher in optical recording systems than in magnetic disk systems. Optical systems are capable of recording in an extremely narrow data track approaching one micron in width. This allows an increase in track densities on the order of 15 times the densities used in state of the art magnetic disk systems. An extremely accurate and sensitive servo system must be used to position the read/write head over such a track.

The optical disk systems that have heretofore provided the highest capability have employed optical feedback for tracking. Changes in reflected or transmitted illumination received from the disk are monitored by appropriate equipment. Illumination changes indicate the occurance and direction of an off-track condition. Appropriate circuitry senses the change and activates a galvanometer controlled mirror in the light path steering the light beam(s) in the appropriate direction to continue track following. Such tracking systems can be extremely accurate and responsive but have range limitations on the order of 100 microns. This limitation arises essentially from the optics through which the light travels between the mirror and the disk. Galvanometer mirror systems allow rapid random access within this range but the optical head must be moved across the disk to obtain access to wider areas. Modern data storage applications require fairly rapid access to any data storage area on the disk, and thus require accurate track accessing over a range of many centimeters and accurate track following upon access.

Galvanometer type servo positioning systems typically access other tracks in one of three ways:

(1) after accessing a first track (the starting point), successively adjacent tracks are accessed, and identified, one at a time, until the desired track is reached;

(2) after identifying the track presently accessed (the starting track), and the track to be accessed (the target track), a determination is made as to the number of tracks n between the starting track and the target track, and whereupon access is achieved by moving the head n tracks, as determined by counting the individual tracks between the starting and target tracks; locking onto each track succesively as the count progresses; or (3) after identifying the starting and target tracks as in method (2) above, a velocity servo is enabled which achieves access by forcing the galvanometer to follow a prescribed velocity profile that steers the optical beam to the vicinity of the target track, whereupon the track identification is read to verify that the desired target track has been reached.

Access method (1) above is extremely slow. Method (2), on the other hand, provides faster access and can be realized with relatively simple counting circuitry. Method (3) provides the fastest access, but also requires the most complex circuitry for its realization. All three methods, however, are limited to the range of the galvanometer system, and do not, therefore, provide the needed rapid random access to all portions of the disk.

It is also a desirable feature in commercial optical disk systems to provide a removable/replacable disk. This allows disks to be readily changed so that information recorded on different disks can be readily accessed. In a removable/replacement disk system, gross errors in alignment (up to several hundreds of microns) of the disk with respect to the head are unavoidable. Such alignment errors will typically exceed the 100 micron tracking radius of most galvanometer systems. It is therefore necessary to provide a servo system which will compensate for these gross errors and which will reliably position the read/write head with direct access over a large area of the optical disk.

Various systems have been developed to improve random access, or compensate for gross positional errors, or both. For example, U.S. Pat. No. 4,094,010 utilizes a plurality of fixed read/write heads spanning an entire disk surface. Each head is associated with a single servo track and a band of data tracks. While rapid access is assured by such a system, the plethora of tracking heads and ancillary equipment required greatly increases the cost and complexity of the system. The optical systems of U.S. Pat. Nos. 4,275,275, 4,160,270 and 4,282,598 each develop a coarse tracking error signal for use by a coarse positioning system to control head movement during tracking. The coarse track signal is developed from the tracking error signal generated by the galvanometer fine tracking system. In U.S. Pat. No. 4,037,252 a coarse control signal is generated from the movement of the fine tracking galvanometer mirror itself as opposed to the signal developed from illumination data obtained from the disk. A significant drawback of these coarse positioning systems is that they do not decouple fine tracking errors from coarse tracking errors, thereby providing a less stable system. Moreover, these systems provide no improved direct random access capability.

SUMMARY OF THE INVENTION

In accordance with the present invention, the constraints of a commercial optical data storage system are met by providing a servo system which has both a coarse access and tracking system and a decoupled fine access and tracking system. Servo signals are pre-recorded on servo tracks concentrically spaced about the axis of the disk and positioned between data bands. These servo tracks can desirably occupy less than 5% of the recordable space on the optical disk. The use of an entire surface for recording servo tracks is not required. The coarse system provides direct access to data bands between the servo tracks, and also provides tracking with respect to the data band tracks. In accordance with the invention, a detector is provided which receives reflected light from an illuminated portion of the disk surface which spans at least the distance between two servo tracks (i.e., one data band width) so that at least one servo track is always illuminated. In preferred embodiments of the invention, a linear solid state detector array is used for this purpose. This allows direct access to the entire disk surface. The fine access system of the present invention responds to light received from a single data track on the disk. The fine system utilizes conventional optical tracking and accessing techniques that have proven to be reliably accurate for the high track densities achievable with optical disks.

In accordance with the invention, two different elements in the optical system/head positioning mechanism are controlled by the servo system. In a preferred embodiment the head access mechanism includes a carriage which is movable radially with respect to the disk. This is controlled by the coarse access and tracking system. The optical system for projecting the read and write light beams onto the disk surface is independently servo controlled by the fine access and tracking system to provide the accurately controlled access to and tracking of a single data track on the disk.

The foregoing and other objects, features and advantages of the invention will be better understood from the following more detailed description and appended claims.

DESCRIPTION OF THE PREFERRED EMBODIMENT

The present invention is best understood by reference to the accompanying drawings wherein like numerals will be used to present like parts throughout.

Figure 1:
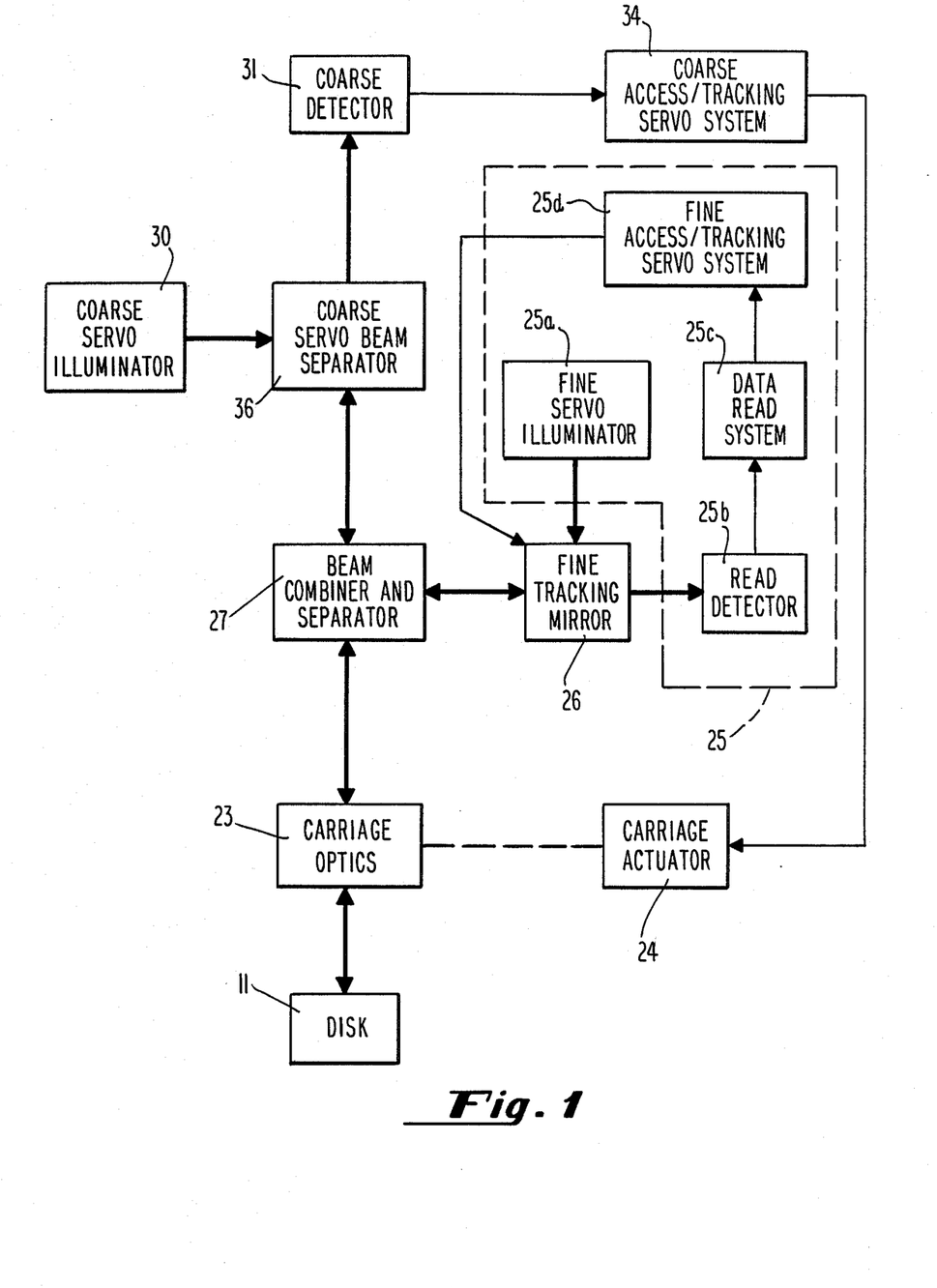
FIG. 1 is a block diagram of the present invention.

FIG. 1 shows a block diagram of the present invention. The various optical paths associated with the system are shown as bold lines, whereas electrical paths are indicated by fine lines. Mechanical coupling, as occurs between the carriage actuator 24 and optics 23 is indicated by a dashed line.

Figure 2:
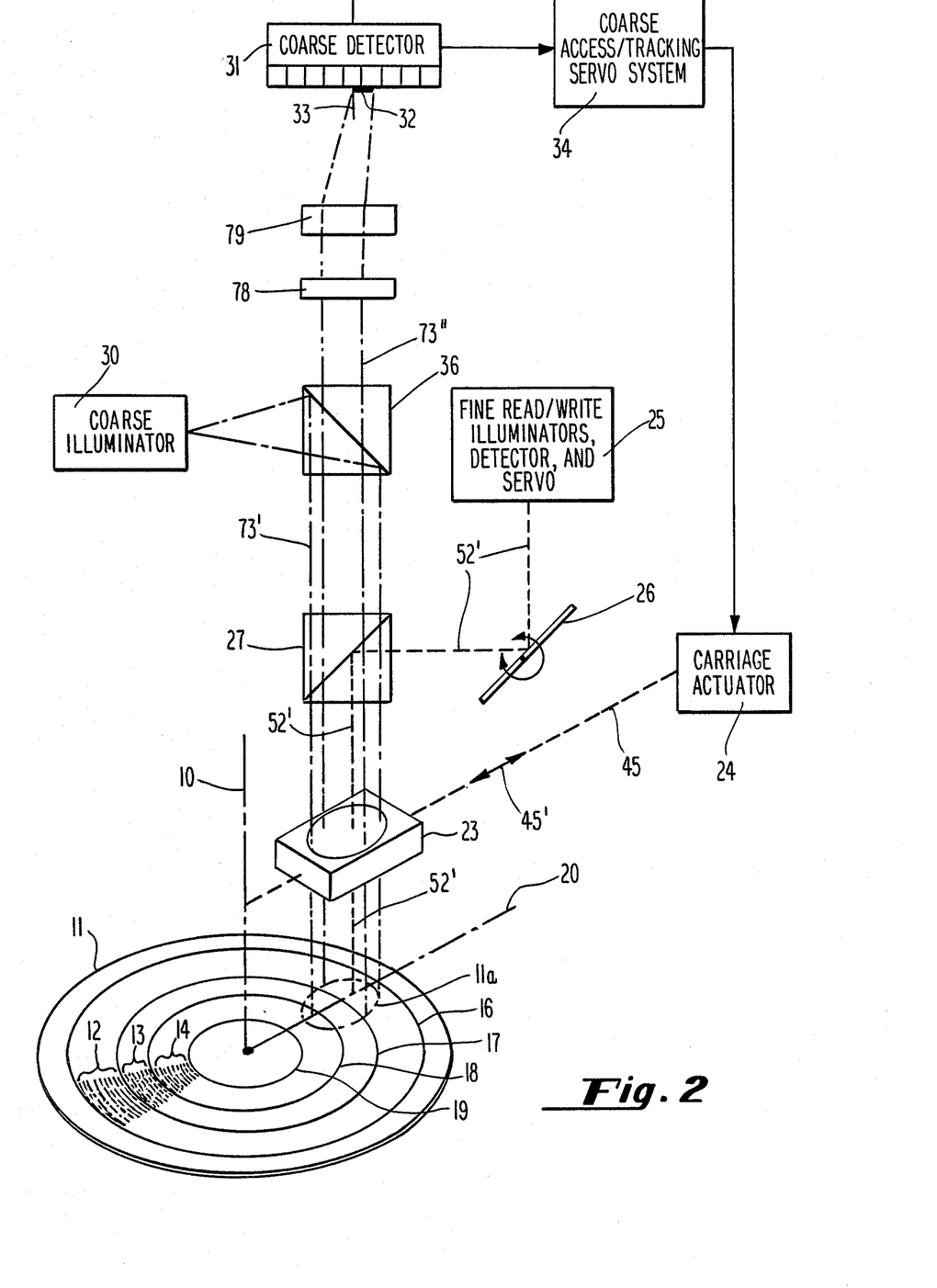
FIG. 2 schematically shows the principal elements of FIG. 1.

Referring next to both FIGS. 1 and 2 the optical disk storage system of the present invention can be explained. The system allows reading and writing from and to the surface of a disk 11 having a rotational axis 10 and a plurality of concentric data bands, 12-14 (FIG. 2). Each of the data bands includes a plurality of data tracks concentrically spaced about the rotational axis. The surface of the disk 11 has pre-recorded thereon, during manufacture, a plurality of optically readable servo tracks 16-19, concentrically and uniformly spaced about the rotational axis of the disk and positioned between the data bands. Also desirably pre-recorded in each data band is a single data track which is used as a starting guide in writing other data tracks in the band.

The disk 11 is rotated about its axis 10 by conventional means. An optical read/write head, depicted by the carriage optics 23, is positioned adjacent to the surface of the disk 11. Carriage actuator 24 selectively moves the read/write head along a radial axis 20 (FIG. 2), thereby moving the carriage optics 23 in a radial direction with respect to the disk 11 in order to access the data bands thereon. The mechanical motion path of the carriage optics 23 is depicted in FIG. 2 as a dotted line 45, with motion being possible in both directions as indicated by the double headed arrow 45'.

A fine servo illuminator 25a (FIG. 1) projects a read or write light beam(s) 52' onto the surface of the disk 11 so as to access data tracks thereon. In order to access the disk surface this beam 52' is reflected by a fine tracking mirror 26, passes through a beam combiner and separator 27, as well as through the carriage optics 23. A read detector 25b reads light which has been reflected from the accessed recorded data track. This reflected light, also depicted as 52' in FIG. 2, passes through the carriage optics 23 and beam combiner and separator 27 before reaching the read detector 25b (FIG. 1). The read detector converts this light to an equivalent electrical signal(s). This read electrical signal is, in turn, supplied to a data read system 25c, and to a fine access/tracking servo system 25d.

In accordance with the present invention, the servo system for access to and tracking of the servo tracks includes a coarse illuminator 30 which projects light 73', represented as dashed-single dot lines in FIG. 2, through the coarse servo beam separator 36, the beam combiner and separator 27, and the carriage optics 23 onto a relatively broad portion 11a of the disk surface. An optical detector 31 detects reflected light 73'', also represented as dashed-single dot lines in FIG. 2, from the portion 11a of the disk surface. It is noted that the illuminated portion 11a of the disk surface spans at least the distance between two servo tracks (i.e, one data band width), and thereby always illuminates at least one servo track. If desired, the system can also be implemented by illuminating and detecting a plurality of servo tracks. As shown in FIG. 2, light is reflected from the portion 11a of the disk 11 between servo tracks 16 and 18 with the image of servo track 17 being projected onto the detector 31, through first lens 78 and second lens 79, as a stripe of light 32. The detector 31 has a center null position 33. The output of linear detector 31 is applied to a coarse access/tracking servo system 34. This system is connected in a servo loop with the actuator 24 which moves the read/write head (represented schematically by the carriage optics 23) into radial proximity of a selected servo track so that the fine access and tracking system 25d can accurately position read or write beams on a selected data track. As indicated previously, light reflected from a single data track on the disk is passed by means of the carriage optics 23, beam separator 27, and tracking mirror 26, and is detected by read detector 25b, the output of which is applied to the fine access/tracking servo system 25d through the data read system 25c. The read or write beams 52' from the illuminator 25a are moved radially with respect to the optical disk 11 by means of the tracking mirror 26, thereby providing for fine selective control of the beam's radial position. The tracking mirror 26, which may be a conventional galvanometer controlled mirror(s), is controlled by the fine access/tracking servo system 25d.

Figure 5:
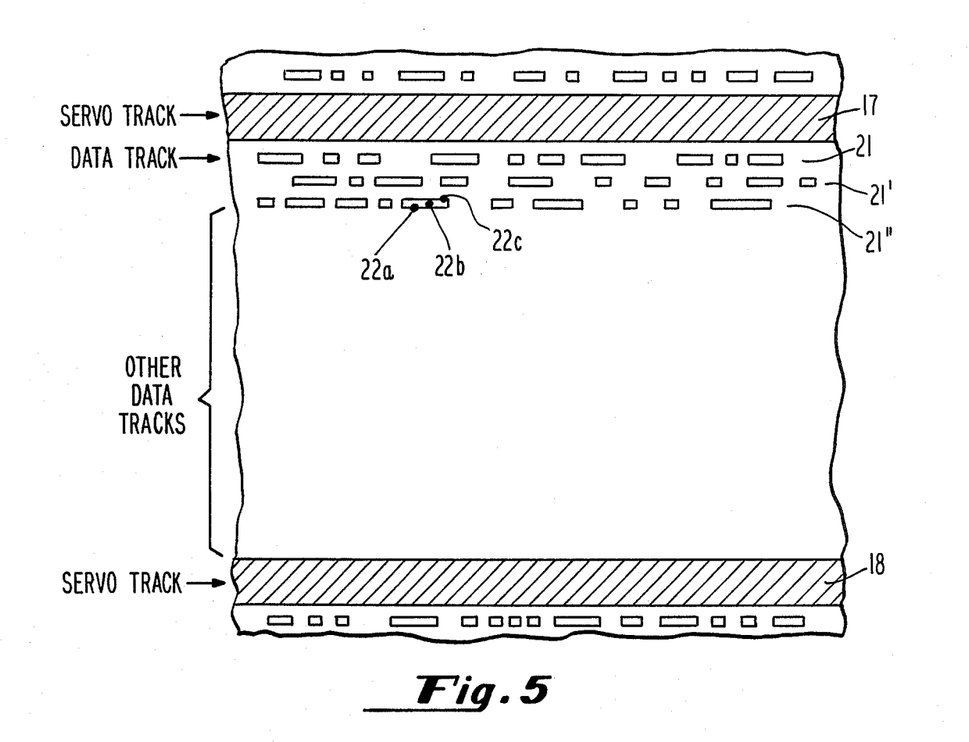
FIG. 5 depicts the servo and data tracks on a disk.

Referring next to FIG. 5, the servo tracks 17 and 18, with exemplary data tracks 21' and 21'' recorded therebetween, are shown. In a preferred embodiment of the invention, 5 to 100 data tracks are typically recorded between servo tracks. One of these data tracks, for example 21, is a pre-recorded home address track which is followed during the recording of the next adjacent data track, for example 21'.

FIG. 5 illustrates the operation of an exemplary and conventional optical read system using three beams indicated by three spots of light 22a, 22b, and 22c projected on the disk surface. The center spot 22b is used for data reading and focus. The adjacent spots 22a and 22c overlap the data track 21'' and provide optical feedback for fine tracking. Light reflected from the spots 22a–22c is detected and applied to the fine access/tracking servo system 25d to follow a given track. When the read beam is on track, the adjacent spots 22a and 22c reflect equal light. If the beams go off track, the light reflected from the two spots 22a and 22c is unbalanced, a condition detected by associated circuits, not depicted, which generate a fine tracking correction signal. This type of tracking also is used for writing in the next adjacent track. For example, in writing the data track 21' on the surface of the disk 11, the fine tracking servo system 25d follows a previously recorded adjacent data track, in this case the pre-recorded home address track 21, while the write beam writes in the track 21'. Thereafter, the fine tracking servo system 25d follows track 21' while the next adjacent track is written, and so on.

In order to allow the servo tracks to be easily discriminated from the data tracks, the servo tracks are preferably three to five times the width of the data tracks. The servo tracks provide improved data track following capability in accordance with this invention by providing coarse tracking control of the read/write head represented schematically in FIG. 2 by the carriage optics 23. The coarse tracks are also used to permit rapid random access to a data band, regardless of whether any data has been recorded in the fine track area. This provides the ability to skip to randomly selected coarse bands for writing, an advantage unique to this approach. Seeking to a band is accomplished simply by counting coarse tracks, in conjunction with analog or digital servo techniques commonly used in magnetic disk drives. Another advantage of this method of seeking is the reduced sensitivity to focus errors. A system that relies on keeping a 1 micron spot sharply in focus during seeking will be much more sensitive to vibration induced during the seek than will the system of the present invention, which features an enlarged servo track providing a more easily recognized return illumination.

Figure 3:
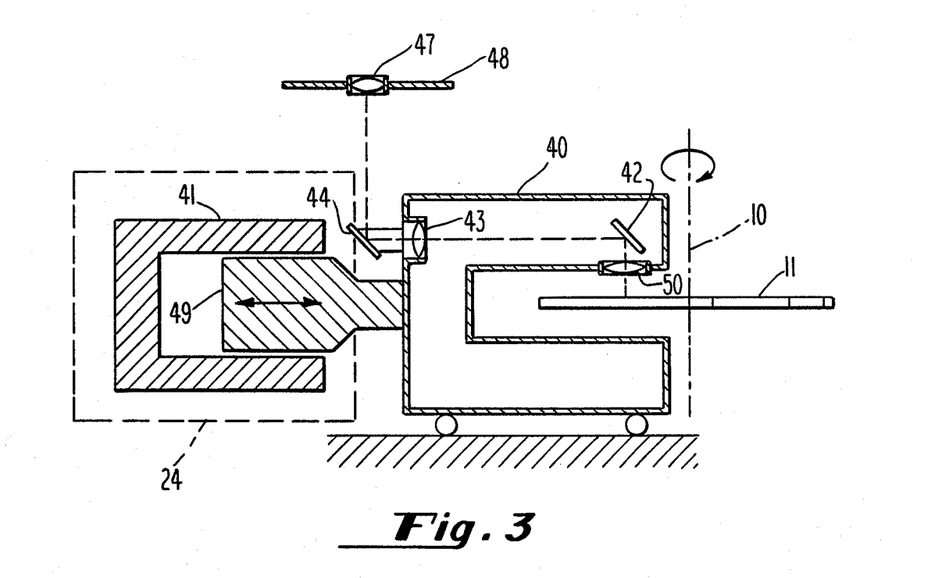
FIG. 3 is a side view showing the relationship between the optical disk, fixed and moving optics packages, and a linear actuator for the read/write heads.

FIG. 3 is a side view that schematically shows the relationship between the optical disk 11 and a moving optics package 40 that is driven by the carriage actuator 24 into a read/write relationship with any of the tracks of the disk 11. While FIG. 3 depicts reading/writing on only one side of the disk 11 it is to be understood that the present invention could also be used with a two sided disk system. The carriage actuator 24 may be realized with a linear motor, such as a voice coil motor that includes a stationary magnet 41 and a movable coil 49. The optical path for either the read or write light beam(s) to the surface of the disk 11 includes an objective lens 50, mirror 42, telescope lens 43, and mirror 44. Light is transmitted to and from the moving optics package 40 through a suitable optics package 47 which includes a prism for directing the light to the moving optics 40 (FIG. 3), which optics package 47 is sometimes referred to hereafter as the prism 47). The optics package 47 is mounted on a fixed optic plate 48 on which the remainder of the optics are mounted and which will be described with reference to FIG. 4.

Figure 4:
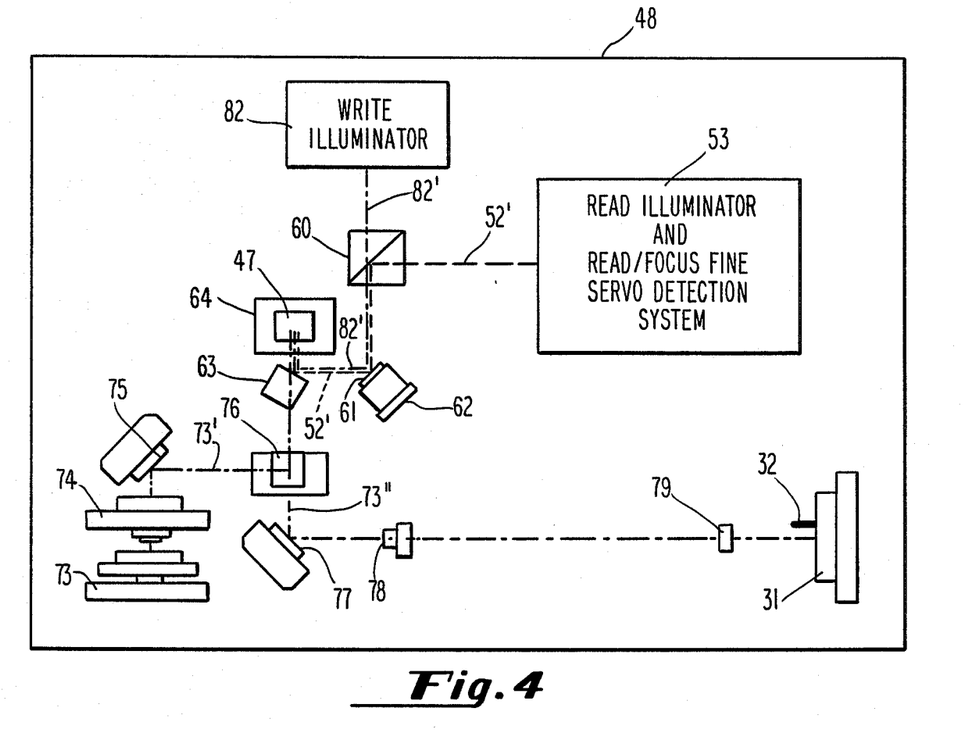
FIG. 4 shows an exemplary configuration of the fixed optics.

Referring to FIG. 4, a read light beam(s), indicated by the dashed line 52' is generated by suitable optical circuitry and components 53. The details of the optics 53 are not important to the present invention. Any optics suitable for use with a conventional three spot galvanometer controlled tracking system, or appropriate tracking system, could be used.

The read beam(s) 52' pass through a first wavelength beam splitter 60 to a read galvanometer 62. A mirror surface 61 on the face of the galvanometer 62 reflects the three spot read beams to a second wavelength beam splitter 63 where the beams are reflected through a prism 47 held by a suitable mount 64. (Note that the galvanometer 62 and mirror surface 61 are equivalent to the fine tracking mirror 26 shown in FIGS. 1 and 2; while the second wavelength beam splitter 63 is equivalent to the beam combiner and separator 27 of FIGS. 1 and 2.) Transmission of the three spot beams to the optical disk surface from the prism 47 is as depicted in FIG. 3.

It is noted that optical disks used with the present system are of a reflective rather than transmissive nature. Thus, the three read spot beams (indicated by illuminated spots 22a–22c of FIG. 5) are reflected along the same path from the disk surface through the elements of the moving optics package 40 (FIG. 3), through the prism 47 where they are again reflected by the second wavelength beam splitter 63, to the read galvanometer mirror surface 61, through the wavelength beam splitter 60, and into the optical subsystem 53, where suitable detection occurs.

Illumination for the coarse access/tracking servo system is provided by a laser 73 which generates a coarse track beam of light indicated by the dot-dash line 73'. The light beam 73' is of a wavelength different from that of the read beam 52. The light beam 73' travels through a lens 74, to a mirror surface 75 and to a polarizing beam splitter 76 which separates the source light from the reflected light at this wavelength. In beam splitter 76, the incident source light 73' is reflected and passes unaffectedly through the wavelength beam splitter 63 to the prism 47 from which it travels to the moving optics package 40 (FIG. 3) as previously described to the disk surface. (Note that the laser 73 and lens 74 are equivalent to the coarse illuminator 30 of FIGS. 1 and 2; while the beam splitter 76 is equivalent to the coarse servo beam separator 36 of FIGS. 1 and 2) The coarse beam spans the distance between at least two servo tracks (i.e., one data band width) on the disk surface as indicated in FIG. 2 (item 11a). Reflected light at this wavelength travels back through the prism 47, again unaffectedly through the wavelength beam splitter 63, through the polarizing beam splitter 76 (which separates the reflected beam from the source beam), to a mirror surface 77, through a first lens 78, a second lens 79, and finally to the linear detector 31 (see also FIG. 1.). First lens 78 forms the image plane of the disk on the surface of the detector 31. Lens 79 is a cylinder lens which narrows the elliptical coarse track beam reflected from the disk surface into a sharp line on the face of the detector 31. The reflected beam is indicated as the second dot-dashed line 73" extending between the beam splitter 76 and the detector 31. The image of the illuminated servo track 19 is again indicated at 32. If the disk is positioned correctly, the image 32 of the servo track 18 is held stationary on the detector 31. If the disk is not positioned perfectly, the image 32 will travel up or down on the detector 31 as the disk rotates. The output of the detector 31 is used to drive the actuator 24 in a manner which keeps the image 32 stationary on the detector during track following. Because of this servo action, the fine access/tracking servo system can perform its function in the same manner as if the disk were perfectly aligned on its spindle. In this manner, the coarse access/tracking servo system compensates for thermal gradients, misalignment (which is inherent in removing and replacing the disk) and disk runout. The servo system of the present invention reduces the apparent radial runout of the disk as seen by the fine tracking system from its actual total value of about plus or minus 100 to 200 microns (typical of removable media devices) by one to two orders of magnitude.

In a preferred embodiment described later with respect to FIG. 7, the length of the detector 31 may be slightly less than the imaged servo track separation (i.e. about one servo track pitch), so that only one servo track appears on the detector 31 at a given time. A signal is produced by the detector 31 that represents the distance of the imaged servo track from the array center (null position 33). This signal is then used to provide position feedback to the linear actuator 24.

FIG. 4 also shows a write beam 82040 which originates from a write illuminator 82. The write beam 82' passes through the wavelength splitter 60 and is reflected from the mirror surface 61 of galvanometer 62 and from wave length beam splitter 63 through the prism 47 and hence through the moving optics package 40 to the surface of the disk 11 as previously described. This write beam is optically positioned a prescribed distance from the read beam(s) 52' so that a write track may be written a prescribed distance from a previously written track or a prescribed distance from the home address track, as previously described in connection with FIG. 5.

Figure 6:
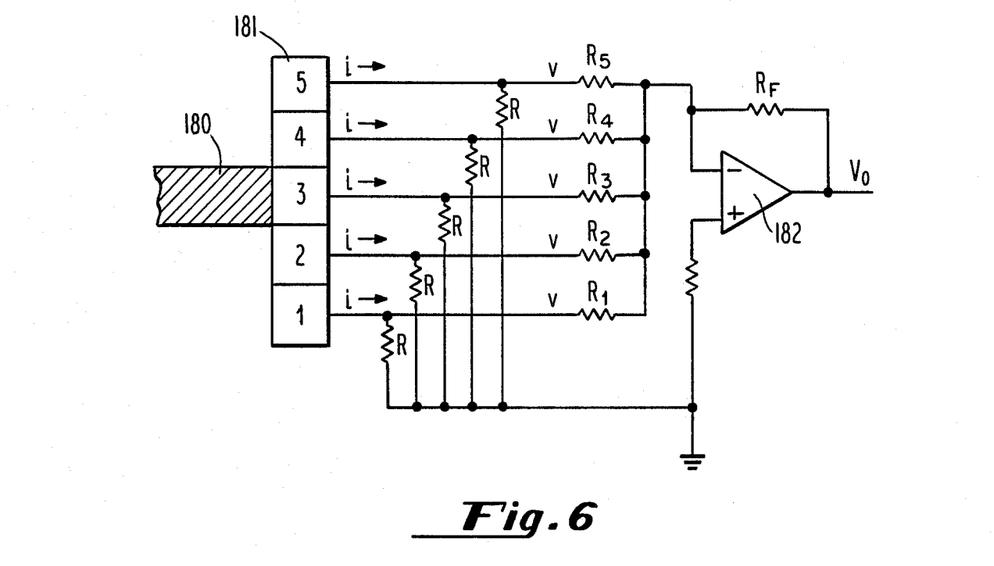
FIGS. 6 and 7 are circuit diagrams of illustrative linear detector circuits used for coarse control.
Figure 7:
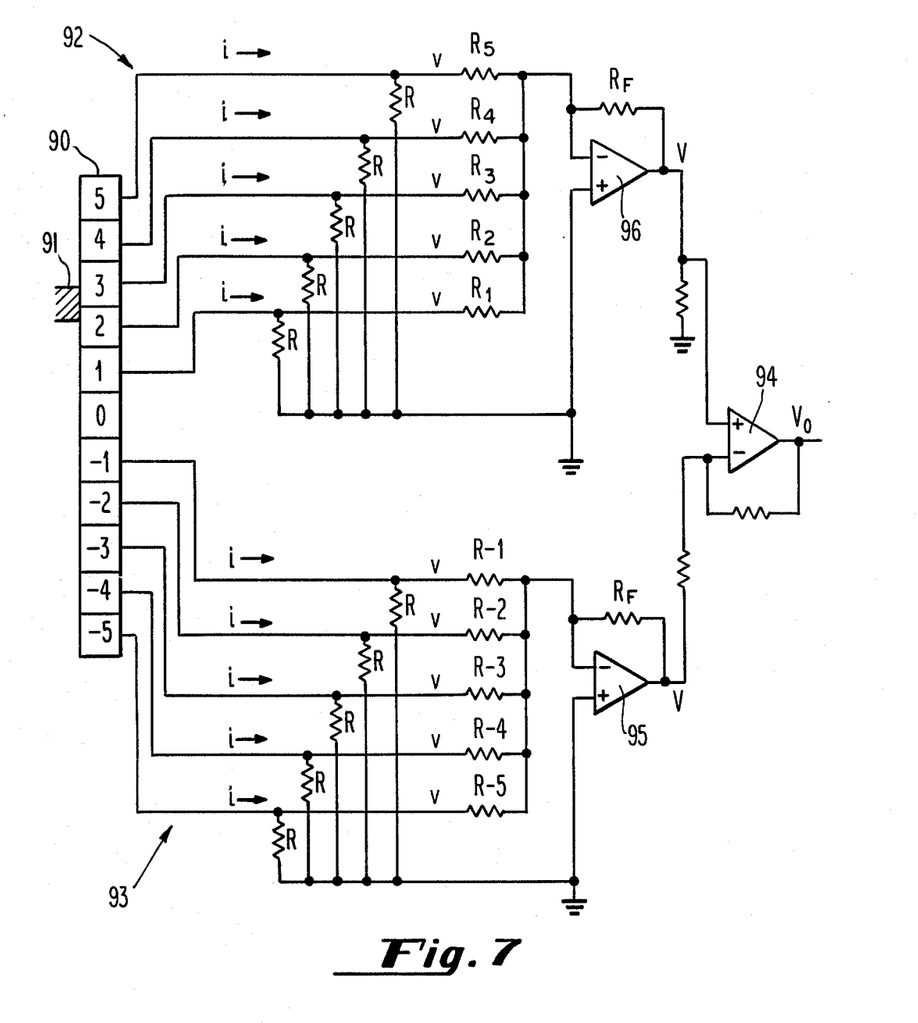

FIGS. 6 and 7 depict two ways to convert the output of the detector 31 into a signal proportional to position. FIG. 6 depicts a circuit producing an output voltage $V_o$ proportional to the location of an illuminated stripe 180 on a multi-element photo detector array 181. The current generated by each array element 1 through 5 passes through an identical resistor R and a summing resistor $R_1$ through $R_5$, respectively. The outputs of the resistors R are connected to ground as is the positive input of an amplifier 182, while the outputs across the resistors $R_n$ (i.e., $R_1$ through $R_5$) are fed into the negative input of the same amplifier 182. Negative feedback is provided by passing the output voltage $V_o$ through resistor $R_F$ and into the negative input of the amplifier 182. Connected in this fashion, the circuit elements form a summing network.

The maximum voltage input to each summing resistor $R_1$ through $R_5$ in FIG. 6 is $$V = iR$$

where i is the current from any fully illuminated element 1 through 5, respectively, of the array 181. The value of each summing resistor $R_n$ is $$R_n = R_F/n$$

where n = 1, 2, 3, 4, 5. Then the output voltage from the fully illuminated element n is:

$$V_o = -V(R_F/(R_F/n)) = -V$$

For the case when the illumination stripe 180 falls partially on the element n, are partially on the element n+1, the photo diode currents are:

$$i_n = mi$$

$$i_{n+1} = (1-m)i$$

where m is the fraction of the reflected light beam that falls on the element n. In this case, the output voltage from the amplifier 182 is: ps
$-V_o = ni_n R + (n+1)i_{n+1}R$ $$V_o = (mn + (n+1)(1-m))iR$$

$$V_o = -[n + (1-m)]V$$

This correctly indicates that the stripe 180 is centered at element n plus a fraction (i-m) of the next element, (n+i). If m=1, all light is falling on element n. If m=o, the stripe shifts fully toward element n+1, as indicated by the formula. Thus, the detector and associated circuit form a linear analog indicator for stripe position.

FIG. 7 depicts a second photo detector array 90 having a central null position indicated by 0 and individual photo diode elements indicated by 1 through 5 and −1 through −5. Each half of the array elements (i.e., 1 through 5 and −1 through −5) is connected to a resistor summing network 92 and 93, each network being the same as the resistor network of FIG. 6. The output $V_1$ and $V_2$ of the two networks 92 and 93, respectively, are combined in a difference amplifier 94 to produce an output voltage $V_o$. The depicted embodiment of FIG. 7 has two functions: (1) to provide a null position centered at element 0 (referenced to ground) and positive and negtive directional information with respect to the null elements; and (2), to minimize background noise by cancelling out variations in the illumination surrounding the stripe 91. Any variation in light intensity common to all elements of the array 90, such as background illumination, is cancelled since equal illumination seen by array elements n and −n would sum to zero. If desired, a photo detector array element may be positioned at the null location 0 in the array 90 and monitored independently of the other array elements to assure that a 0 output from the circuit corresponds to perfect alignment of the beam 91 on the null position and not the absence of a beam. The magnitude of the output voltage $V_o$ is proportional to the distance of the beam 91 away from the null position 0 on the detector 90 and its sign indicates direction from the null.

Even with the configuration of FIG. 7, however, one concern must be addressed, and that is the effect that data tracks, which may not be present (depending upon whether data has yet been written onto the disk), will have on the output signal. The presence of such data tracks will cause variations in the background reflected light that may fall unevenly on the fact of the detector 31. Thus, in order to prevent this varying and unknown background light from adversely affecting the true location of the stripe position, some compensation or correction means must be employed. One suitable means is to use a threshold detector, or equivalent, to eliminate the one-sided effects of the data track background light from the output voltages $V_1$, and $V_2$, prior to combining these voltages in the difference amplifier 94. Such a threshold detector advantageously could be designed into the summing amplifiers 95 and 96 by one skilled in the art.

Figure 8:
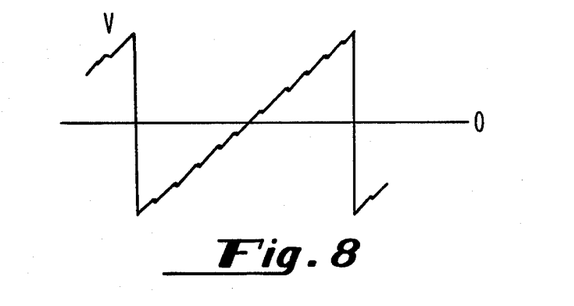
FIG. 8 is a diagram of the output of the linear detector circuit of FIG. 7 during radial movement of the head across the disk.

FIG. 8 depicts the voltage output of the circuit of FIG. 7 with respect to the central null 0 (ground) as a beam 91 sweeps across the elements of the array 90 during radial movement of the moving optical head 40. The output of each element of the array 90 changes proportionally with the distance traveled. A slight horizontal stair step, greatly exaggerated in FIG. 8, is introduced by optical dead spots between each pair of the array elements n and n+1. As the reflected light beam 91, from any particular servo track passes off the face of the array 90, a new reflected beam from an adjacent servo track is received at the opposite end of the array generating the large saw tooth effect depicted.

While a particular embodiment of the invention has been shown and described, various modifications are within the true spirit and scope of the invention. The appended claims are, therefore, intended to cover all such modifications.

What is claimed is:

1. An optical disk storage system for reading data from or writing data to a removable disk surface having a rotational axis and a plurality of data bands, each data band including a plurality of data tracks concentrically spaced about the rotational axis, the system including:
   means for rotating the disk surface about the rotational axis;
   an optical head positioned adjacent to the disk surface for reading or writing or both;
   means for positioning said optical head with respect to the disk surface in a radial direction;
   means for projecting a plurality of read/write light beams through said optical head onto the disk surface to a desired one of the data tracks within a desired one of the data bands, said projecting means including means for generating a fine tracking correction signal that is indicative of an off-track condition of said plurality of read/write light beams from said desired track;
   a coarse tracking servo system comprising:
      a plurality of optically readable servo tracks concentrically spaced about the rotational axis of the disk surface, each said servo track disposed between adjacent pairs of the data bands;
      a coarse illuminator for generating a coarse beam that is separable and distinct from said read/write light beams;
      means for directing said coarse beam to the disk surface along an optical path through said optical head so that said coarse beam continuously illuminates a portion of the disk surface that spans at least a distance between two servo tracks, thereby always including at least one servo track as well as the desired data tracks accessed by said read/write light beams, within said continuously illuminated portion of the disk surface;
      means for directing an image plane of said portion of the disk surface continuously illuminated by said coarse beam onto a detector, said detector including means for generating an error signal representative of a distance that an image of said at least one illuminated servo track within said image plane is from a desired null position on a surface of said detector; and
      means for coupling said error signal to said optical head positioning means, said optical head positioning means responding to said error signal so as to move said optical head in a direction that maintains said at least one illuminated servo track image at said desired null position of said detector; and
      means for combining said read/write light beams into said optical path as said read/write light beams travel towards the disk surface, and for separating said read/write light beams out of said optical path as said read/write light beams return from the disk surface, said beam combining and separating means effectively decoupling said coarse tracking servo system from said projecting means;
   whereby said optical head is maintained in a desired tracking position relative to said at least one illuminated servo track independent of said read/write light beams.

2. The servo system recited in claim 1 wherein said detector comprises:
   an array of photo-electrical elements;
   means connected to the electrical output of each photo-electrical element for generating a characteristic voltage identifying the element when illuminated by the image of the illuminated servo track; and means for combining said characteristic voltages to identify the elements being illuminated by said illuminated servo track.

3. In a data storage system including an optical disk for storing information, the optical disk having recorded upon a surface thereof a plurality of data bands, each of the data bands including a servo track and a plurality of data tracks, the data storage system including an optical head, movable radially with respect to the disk surface, and means for projecting one or more read/write light beams through the optical head onto the disk surface for reading or writing data, the means for projecting including means for moving the one or more read/write light beams radially with respect to the disk surface, a method for controllably positioning the one or more read/write light beams on the disk surface comprising the steps of:

(1) positioning the optical head at a desired location with respect to the disk surface by:

continuously illuminating a portion of the disk surface that spans at least the distance between two servo tracks, thereby always including within said illuminated portion at least one servo track, said continuous illumination being effectuated by a first light beam that is projected along an optical path through the optical head, directing an image plane of said illuminated portion of the disk surface illuminated by said first light beam to a first detector, said image plane including an image of said illuminated servo track, detecting a location of said servo track image within said image plane relative to a reference location on said first detector, and positioning the optical head as a result of said detection performed by said first detector so as to maintain said servo track image in a desired alignment with said reference location, whereby the optical head is maintained in a desired tracking position relative to said illuminated servo track;

(2) positioning the one or more read/write light beams on the disk surface by:

illuminating at least one of data tracks with a second light beam projected through the optical head onto the disk surface, detecting light returned from said at least one illuminated data track with a second detector, generating a fine tracking correction signal, in response to said detection performed by said second detector, that is indicative of an off-track condition of the one or more read/write light beams from said at least one illuminated data track, and moving the one or more read/write light beams with the moving beams as a result of said detection performed by said second detector, and responsive to said fine tracking correction signal;

(3) combining the one or more read/write light beams into said optical path as the one or more read/write light beams travel towards the disk surface; and (4) separating the one or more read/write light beams out of said optical path as the one or more read/write light beams return from the disk surface, thereby effectively decoupling positioning step (1) from positioning step (2).

4. In an optical disk storage system that includes read/write light beams that are controllably directed through an optical head to a surface of a rotating disk for the purpose of writing data in data tracks or reading data from previously written data tracks, the read/write light beams being controllably directed by means for generating a signal representative of fine tracking errors, a servo system for maintaining the optical head at a desired radial position with respect to the disk surface regardless of alignment, runout, and other errors associated with mounting and rotating the disk about its rotational axis, the servo system comprising:

a multiplicity of concentric servo tracks disposed on a surface of said disk, the disk surface between adjacent pairs of said servo tracks comprising data bands whereat said data tracks may be written;

carriage actuator means for positioning the optical head at a desired radial position with respect to the disk surface in response to a head positioning signal;

means for continuously illuminating a portion of the disk surface with a single coarse beam directed along an optical path through said optical head, which single coarse beam, at a point where it is incident on the disk surface, spans at least a distance between two servo tracks, thereby always including at least one servo track within said portion of the disk surface continuously illuminated by said single coarse beam;

means for combining the read/write light beams into said optical path as the read/write light beams travel towards the disk surface, and for separating the read/write light beams out of said optical path as the read/write light beams return from the disk surface;

means for directing an image plane of the portion of the disk surface continuously illuminated by said single coarse beam to a detector, said detector including means for sensing a location of an image of said illuminated servo track within said image plane relative to a reference position on said detector, said detector further including means for generating an error signal representative of a distance between said illuminated servo track image and said reference position; and means for converting said error signal to said head positioning signal, said converting means being effectively decoupled by said beam combining and separating means from the fine tracking errors that are represented by the signal generated by the means which controllably direct the read/write light beams to the disk surface, and said head positioning signal causing said carriage actuator means to position and maintain the optical head in a position that maintains a desired alignment between said illuminated servo track image and said reference position on said detector.

5. The servo system of claim 4 wherein said continuously illuminating means comprises a coarse illuminator for generating said single coarse beam, said single coarse beam being separate and distinct from the read/write light beams used to write and read data; and means for directing said coarse beam along a optical path, through said optical head, to the surface of said disk, at least a portion of said optical path being shared by the read/write light beams.

6. The servo system of claim 4 wherein said coarse beam travels unaffectedly through said combining and separating means regardless of whether said coarse beam is traveling towards or returning from the surface of said disk, a coarse beam returning from the surface of the disk comprising the means for directing the image plane of the illuminated portion of the disk to the detector.

7. The servo system of claim 6 wherein said optical path includes coarse beam separator means for separating the coarse beam traveling from said coarse illuminator towards the surface of the disk from the coarse beam returning from the surface of the disk towards said detector.

8. The servo system of claim 7 further including lens means disposed between said beam separator means and said detector for directing the image plane of the illuminated portion of the disk onto the detector.

9. An optical disk storage system for reading data from or writing data to a removable disk surface having a rotational axis and a plurality of data bands, each data band including a plurality of data tracks concentrically spaced about the rotational axis, said system including:

means for rotating the disk surface about the rotational axis;

an optical head positioned adjacent to the disk surface for reading or writing or both;

means for positioning said optical head in a radial direction with respect to the disk surface;

means for projecting read/write light beams through said optical head onto the disk surface for finely accessing and tracking a desired one of the data tracks within a desired data band, said projecting means including means for generating a fine tracking correction signal that is indicative of an off-track condition of said plurality of read/write light beams from said desired track;

a coarse tracking servo system, comprising:

a plurality of optically readable servo tracks concentrically spaced about the rotational axis of the disk surface, each said servo track disposed between adjacent pairs of the data bands;

a coarse illuminator for generating a coarse beam that is separable and distinct from said read/write light beams;

means for directing said coarse beam to the disk surface along an optical path through said optical head so that the coarse beam continuously illuminates a portion of the disk surface that spans at least the distance between one said servo track and the next servo track, always including within said illuminated portion of the disk surface at least one servo track as well as the desired data tracks accessed by said read/write light beams;

means for directing an image plane of said illuminated portion onto a detector array, said detector array including means for generating an error signal representative of the distance that an image of the illuminated servo track within said image plane is from a desired null position on the surface of said detector array; and means for coupling said error signal to said optical head positioning means, said optical head positioning means responding to said error signal so as to move said optical head in a direction that maintains said image at the desired null position of the detector array; and means for combining said read/write light beams into said optical path as said read/write light beams travel towards the disk surface, and for separating said read/write light beams out of said optical path as said read/write light beams return from the disk surface, thereby effectively decoupling said coarse tracking servo system from said fine tracking correction signal of said projecting means;

whereby said optical head is maintained in a desired tracking position relative to said illuminated servo track independent of said read/write light beams.

* * * * *

UNITED STATES PATENT AND TRADEMARK OFFICE
CERTIFICATE OF CORRECTION

PATENT NO. : 4,805,162
DATED : February 14, 1989
INVENTOR(S) : Stahl et al.

It is certified that error appears in the above-identified patent and that said Letters Patent is hereby corrected as shown below:

Col. 6, line 40 insert "package" between "optics" and "40".

Col. 7, lines 32 and 33 change "Fig. 1" to --Fig. 2--.

Col. 7, line 59 change "magnititude" to --magnitude--.

Col. 8, line 1, change "82040" to --82'--.

Col. 8, line 42 at the end of the equation, change "-V" to -- -nV --.

Col. 8, line 44 change "are" to --and--.

Col. 8, line 51 delete "ps" after the word "is:"

Col. 8, line 54 change "$V_o$" to -- $-V_o$ --.

Signed and Sealed this

Ninth Day of January, 1990

*Attest:*

JEFFREY M. SAMUELS

*Attesting Officer*   Acting Commissioner of Patents and Trademarks